United States Patent
Muller

(10) Patent No.: US 10,281,569 B2
(45) Date of Patent: May 7, 2019

(54) METHOD FOR LOCATING A TARGET AND MULTISTATIC RADAR SYSTEM FOR IMPLEMENTING SUCH A METHOD

(71) Applicant: THALES, Courbevoie (FR)

(72) Inventor: Daniel Muller, Toulouse (FR)

(73) Assignee: THALES, Courbevoie (FR)

( * ) Notice: Subject to any disclaimer, the term of this patent is extended or adjusted under 35 U.S.C. 154(b) by 705 days.

(21) Appl. No.: 14/891,657

(22) PCT Filed: May 22, 2014

(86) PCT No.: PCT/EP2014/060539
§ 371 (c)(1),
(2) Date: Nov. 16, 2015

(87) PCT Pub. No.: WO2014/187898
PCT Pub. Date: Nov. 27, 2014

(65) Prior Publication Data
US 2016/0084950 A1    Mar. 24, 2016

(30) Foreign Application Priority Data

May 24, 2013    (FR) ...................................... 13 01182

(51) Int. Cl.
*G01S 7/40*    (2006.01)
*G01S 7/41*    (2006.01)
(Continued)

(52) U.S. Cl.
CPC .......... *G01S 13/003* (2013.01); *G01S 7/4021* (2013.01); *G01S 7/418* (2013.01); *G01S 13/42* (2013.01); *G01S 13/58* (2013.01); *G01S 13/872* (2013.01)

(58) Field of Classification Search
CPC ...... G01S 1/20; G01S 13/003; G01S 13/0218; G01S 2013/0227; G01S 7/4021;
(Continued)

(56) References Cited

U.S. PATENT DOCUMENTS 5,252,980 A * 10/1993 Gray ..................... G01S 13/003
                                                          342/107
6,133,876 A * 10/2000 Fullerton ................ G01S 13/42
                                                          342/132
(Continued)

FOREIGN PATENT DOCUMENTS

EP    1 500 951 A1    1/2005
EP    1 972 962 A2    9/2008
(Continued)

OTHER PUBLICATIONS

M.R. Inggs et al., "Commensal radar using separated reference and surveillance channel configuration," Electronics Letters, vol. 48, No. 18, Aug. 30, 2012, pp. 1158-1160, XP006041177.
(Continued)

*Primary Examiner* — Peter M Bythrow
(74) *Attorney, Agent, or Firm* — Baker & Hostetler LLP

(57) ABSTRACT

A method for locating a target comprises: a) receiving, by means of $N \geq 1$ receivers, opportunity radioelectric signals transmitted by $M \geq 1$ transmitters and reflected by the target, with $N \cdot M \geq 3$, or at least one transmitter being situated out of sight of at least one receiver; b) receiving, by means of a data transmission link, one or more reference signals, representative of the radioelectric signals transmitted by each transmitter situated out of sight of at least one receiver; and c) determining the position of the target on the basis of the radioelectric signals and of the reference signal or of the reference signals. An application of the method to the primary monitoring of air traffic, a multistatic radar system for the implementation of the method, and a system for
(Continued)

monitoring air traffic comprising a multistatic radar system are provided.

20 Claims, 5 Drawing Sheets

(51) Int. Cl.
*G01S 13/00* (2006.01)
*G01S 13/42* (2006.01)
*G01S 13/58* (2006.01)
*G01S 13/87* (2006.01)

(58) Field of Classification Search
CPC .......... G01S 7/418; G01S 13/42; G01S 13/58; G01S 13/872
See application file for complete search history.

(56) References Cited

U.S. PATENT DOCUMENTS

| | | | | |
|---|---|---|---|---|
| 7,155,240 | B2* | 12/2006 | Atkinson | G01S 13/003 455/456.2 |
| 7,277,052 | B2* | 10/2007 | Delaveau | G01S 7/352 342/387 |
| 2002/0130807 | A1* | 9/2002 | Hall | G01S 7/282 342/28 |
| 2002/0167440 | A1* | 11/2002 | Baugh | G01S 7/023 342/159 |
| 2003/0020653 | A1* | 1/2003 | Baugh | G01S 7/285 342/451 |
| 2004/0257270 | A1* | 12/2004 | Poullin | G01S 7/414 342/159 |
| 2008/0158061 | A1* | 7/2008 | Greverie | G01S 13/003 342/453 |
| 2010/0085243 | A1* | 4/2010 | De Gramont | G01S 7/352 342/175 |
| 2011/0128181 | A1* | 6/2011 | Galati | G01S 13/003 342/107 |
| 2012/0014412 | A1* | 1/2012 | Nakagawa | G01S 5/12 375/130 |
| 2012/0098697 | A1* | 4/2012 | Paek | G01S 13/003 342/174 |
| 2012/0139789 | A1* | 6/2012 | Smith | G01S 5/06 342/385 |

FOREIGN PATENT DOCUMENTS

| | | |
|---|---|---|
| GB | 2 378 335 A | 2/2003 |
| WO | 03/014764 A1 | 2/2003 |

OTHER PUBLICATIONS

Moruzzis et al., "Alternative Detection Techniques to Supplement PSR Coverage," Feb. 28, 2007, pp. 1-77, XP055106994. <http://www.eurocontrol.int/sites/default/files/publication/files/surveillance-report-alternative-detection-techniques-to-supplement-psr-coverage-20070228.pdf>.

* cited by examiner

METHOD FOR LOCATING A TARGET AND MULTISTATIC RADAR SYSTEM FOR IMPLEMENTING SUCH A METHOD

CROSS-REFERENCE TO RELATED APPLICATIONS

This application is a National Stage of International patent application PCT/EP2014/060539, filed on May 22, 2014, which claims priority to foreign French patent application No. FR 1301182, filed on May 24, 2013, the disclosures of which are incorporated by reference in their entirety.

FIELD OF THE INVENTION

The invention pertains to a method for detecting and locating a target which may be notably an aircraft, to its application to the primary monitoring of air traffic, to a multistatic radar system for the implementation of such a method and to a system for monitoring air traffic comprising such a multistatic radar system.

The invention applies notably to the primary monitoring of air traffic by means of opportunity signals such as television signals.

BACKGROUND

The primary monitoring (without cooperation on the part of the aircraft-targets) of air traffic is conventionally done by means of "monostatic" radars, which transmit radio pulses and receive the reflections of said radio pulses by targets (aircraft) to be detected, the transmitter and the receiver of each radar being co-located. There also exist so-called "multistatic" systems, comprising one or more transmitters of radio signals and a plurality of receivers not co-located with the transmitter or transmitters for receiving the reflections. In all these cases, these are "active" systems, transmitting radio signals specifically intended for the detection of targets.

There also exist so-called passive detection systems, which exploit, in a detection scheme of multistatic type, radioelectric signals available elsewhere ("opportunity signals"), for example radiophonic or television signals. One then speaks of passive coherent location (PCL). Purely passive systems are not appropriate for applications as critical as air traffic monitoring; however, it would be possible—at least in principle—to produce "semi-active" systems, using opportunity transmitters according to a cooperative modality, based on an agreement with the operators of these transmitters.

FIG. 1 illustrates the basic principle of multistatic detection, be it active or passive. A transmitter ER transmits a radioelectric signal SRE which propagates in the air and reaches a receiver RR following two routes:
 a direct path, $T_1$, whose length $L_1$ is equal to the distance D between the transmitter and the receiver; and
 an indirect path, $T_2$, comprising a reflection by a target to be detected C (here, an aircraft), exhibiting a length $L_2 > L_1$ which depends on the position of said target.

The signal that followed the direct path (reference signal) and the one that followed the indirect path reach the receiver from different directions; they can therefore be discriminated, for example by means of an array antenna equipped with a beam-forming circuit (digital synthesis of the reception pattern). Their relative propagation delay, $\Delta t_p = \Delta L/c = (L_2 - L_1)/c$ (c being the propagation velocity of the radioelectric signals, that is to say the velocity of light) can then be determined by cross-correlation, thereby making it possible to calculate $L_2$ ($L_1$ being assumed known). It is then known that the target is situated on an ellipsoid whose foci are the transmitter and the receiver, defined as the locus of the points, the sum of whose distances from the two foci is equal to $L_2$ ("bistatic distance"). If at least two other transmitter/receiver pairs are available (for example, if there are at least three receivers for a single transmitter, or vice versa, or else two transmitters and two receivers etc.), the target C can be located by intersection between the various ellipsoids. In the case of a target in motion, the reflected signal is frequency shifted through the Doppler effect. The correlation is therefore calculated several times, introducing different frequency shifts between the two signals; the value of frequency shift for which the correlation is a maximum makes it possible to determine a "bistatic velocity" which is the derivative of the bistatic distance $L_2$ with respect to time. The velocity vector of the target can be obtained on the basis of three different "bistatic velocities".

It is easily understood that, for direct propagation to be possible, the transmitter and the receiver must be "in line of sight" thereby implying that, on account of the curvature of the Earth, their distance may hardly exceed a few tens of kilometers, unless at least one of the two is placed at a high altitude, this not always being possible or desirable. This is not a problem in active multistatic radars, in which the radiation patterns of the transmitters are defined as a function of the detection requirements, but becomes so in the case of passive detection systems applied to air traffic monitoring.

Location of the target is affected by an uncertainty whose value depends on the bandwidth of the radioelectric signals which are used for detection. This limits the choice of the opportunity transmitters that may be used for air traffic monitoring. Indeed, the use of FM radiophonic transmitters (bandwidth of about 20 kHz) leads to uncertainties of the order of 1 km and is therefore unsuitable for the monitoring of civil air traffic (although it is appropriate for other applications, for example for aircraft detection), while television signals (bandwidth of about 10 MHz) make it possible to achieve uncertainties of the order of 20 m, this being satisfactory for civil air traffic monitoring. However, television transmitters transmit beams that are substantially parallel to the ground and exhibit, in a vertical plane, a small angular aperture (of the order of 2° to 4°). This implies that an airplane flying at an altitude of 30,000 feet (about 9144 m) is illuminated only by television transmitters situated more than 300 km away.

This situation is illustrated with the aid of FIG. 2. This figure (which is not to scale) represents a transmitter ER on the surface—spherical—of the Earth, ST. The transmitter transmits a radioelectric signal SRE in the form of a relatively narrow beam, propagating along a mean direction parallel to the tangent plane to the terrestrial surface ST at the level of the transmitter. The hatched line TV represents the flight trajectory of a target consisting of a civil airplane. This line is parallel to the terrestrial surface and remains at a distance H, of the order of 9,000 m, from the latter. It may be seen that the beam SRE intercepts the trajectory TV in a detection zone ZD which is very distant from the transmitter ER. On the other hand the receiver RR, which exhibits a height of a few tens of meters at most with respect to the surface ST, must be much closer to the transmitter ER in order to be able to intercept the beam SRE.

Consequently, the coverage ensured by a group of television transmitters and of receivers forming a passive multistatic radar exhibits a "blind cone" at the high altitudes which are of interest in aerial monitoring. FIGS. 3A and 3B illustrate this effect in the case of a multistatic system comprising a television transmitter Tx and three receivers Rx situated in a radius of about 30 km around the transmitter so as to be "in line of sight" ("LOS"). In FIG. 3A, the region $RC_{1000}$ represents the coverage at an altitude of 1000 feet (304.8 m): it may be seen that it exhibits an approximately convex shape. In FIG. 3B, on the other hand, the region $RC_{30,000}$ represents the coverage at an altitude of 30,000 feet (9144 m), which is in the shape of a circular ring; there is no coverage in the central region where the transmitter and the receivers are situated. The gaps of the ring correspond to the directions of alignment between the transmitter and a receiver and for which the radiation patterns of the receivers exhibit zeros so as to reject the direct signals. It is readily understood that it is not practical to carry out full coverage of a territory by using ring-shaped detection regions, all the more so as the location of the television transmitters is not optimized for this application. Moreover, the passive location of a target situated at a distance of several hundred kilometers from the transmitters and receivers would be rendered difficult by the significant attenuation undergone by the signals.

Document WO 03/014764 discloses a method of collaborative coherent location not requiring the receivers to be in line of sight of the transmitter or transmitters. This method uses the detection of predefined sequences inserted into the signals emitted by the transmitters so as to alleviate the absence of reference direct signals. This technique is constraining, since it necessitates a modification of the transmitted signals. Furthermore, the integration of the signals received can only be done over the duration of the predefined sequences, which are generally fairly brief; this implies that the method can only operate under good signal-to-noise ratio conditions.

Document EP 1 972 962 discloses a method of passive and non-cooperative coherent location not requiring the receivers to be in line of sight of the transmitters. This method uses the extraction of distinctive characteristics ("fingerprints") of the signals received after reflection by the target so as to alleviate the absence of reference direct signals. Such a technique can only operate under restrictive assumptions, notably a high signal-to-noise ratio. Furthermore, it seems better suited to analog modulations than to digital modulations, ever more widespread in opportunity signals.

The Final Report "ADT—Alternative Detection Techniques to Supplement PSR Coverage", prepared by the company Thales Air Systems for Eurocontrol (European organization for air navigation safety), describes an active multistatic radar system in which the reference signal can be sent from the transmitters to the receivers by means of a data transmission link, for example wired. Such a system consists of dedicated transmitters and receivers, arranged according to a predefined layout and at distances of a few tens of kilometers. The use of opportunity signals is not envisaged.

The article by M. R. Inggs et al. "Commensal radar using separated reference and surveillance channel configuration", Electronics Letters, Vol. 48, No. 18, 30 Aug. 2012 discloses a bistatic radar for aerial monitoring using opportunity signals comprising an opportunity transmitter and a receiver out of sight of said transmitter.

SUMMARY OF THE INVENTION

The invention is aimed at remedying the aforementioned drawbacks of the prior art.

A subject of the invention making it possible to achieve this aim is a method for locating a target, characterized in that it comprises the following steps:

a) receiving, by means of N≥1 receivers, opportunity radioelectric signals transmitted by M≥1 transmitters and reflected by said target, with N·M≥3, said or at least one said transmitter being situated out of the sight of said or of at least one said receiver;

b) receiving, by means of a data transmission link, one or more so-called reference signals, representative of the radioelectric signals transmitted by said or each said transmitter situated out of the sight of said or of at least one said receiver; and c) determining the position of said target on the basis of said radioelectric signals and of said reference signal or of said reference signals.

In a manner known per se, "opportunity signals" is intended to mean signals which are not transmitted with the aim of allowing the detection of a target, but in order to accomplish some other function, for example information transmission. These will mainly be radiophonic or television signals. The use of opportunity signals is preferred, but such a method could also use non-opportunity signals.

The data link can be digital (preferred embodiment) or analog.

In accordance with the invention, the use of a data transmission link—which can be a public or private communications network or a dedicated link, notably wired—to transmit the reference signals makes it possible to arrange the receivers at a larger distance from the transmitter or transmitters than if the line of sight condition had to be satisfied.

According to various embodiments of the invention:

Said step c) can comprise the reconstruction, on the basis of said reference signal or of said reference signals, of replicas of the radioelectric signals which would be received by said or each said receiver by direct propagation from said or from each said transmitter situated out of sight if direct propagation such as this were possible.

Said reconstruction can comprise an operation of frequency-shifting of said replicas.

Said reconstruction can comprise an operation of compensating for the transmission delay of said reference signal or of said reference signals along said data transmission line.

Said reconstruction can also comprise an operation of temporal shifting of said replicas so as to introduce a delay proportional to the distance between said or each transmitter situated out of sight and said or each said receiver.

Said step c) can be implemented with the aid of a common temporal reference shared by said transmitter or transmitters and by said receiver or receivers.

Said step c) can comprise: the calculation of at least three bistatic distances between said or at least one said receiver, said or at least one said transmitter and said target, this state calculation performed by correlation between the signals received by said receiver or said receivers and said replicas; and the location of said target on the basis of said bistatic distances.

More particularly, said step c) can comprise an operation of iterative synchronization of said replicas with said common temporal reference, carried out by minimizing the disparities between the positions of said target that are determined using various sets of three said bistatic distances. Or else, said step c) can comprise an operation of synchronizing said replicas with said common temporal reference by means of temporal markers contained in said radioelectric signals and in said or each said reference signal.

Said correlation can be performed using a plurality of versions of said replicas exhibiting different Doppler shifts, its result being also used to determine a velocity of displacement of said target.

Said step c) can also comprise an operation of equalizing said replicas so as to simulate a direct propagation between a said transmitter and a said receiver.

Said radioelectric signals can be television signals.

Said or each reference signal can be a source signal, on the basis of which a plurality of said transmitters generate the corresponding radioelectric signals by using respective modulation parameters.

Another subject of the invention is the application of such a method to aircraft location, notably for the primary monitoring of air traffic.

Yet another subject of the invention is a multistatic radar system comprising M≥1 transmitters of opportunity radioelectric signals, N≥1 receivers for receiving said radioelectric signals, with N·M≥3, said or at least one said transmitter being situated out of the sight of said or of at least one said receiver, as well as data processing means; characterized in that it also comprises a data transmission link for transmitting to said data processing means one or more so-called reference signals, representative of the radioelectric signals transmitted by said or each said transmitter situated out of the sight of said or of at least one said receiver, said data processing means being configured or programmed to determine the position of a target reflecting the radioelectric signals transmitted by said transmitter or said transmitters on the basis of the radioelectric signals received by said receiver or said receivers and of said reference signal or of said reference signals.

According to various embodiments of such a system:
Said reference signal can be representative of a source file on the basis of which a plurality of said transmitters generate the corresponding radioelectric signals by using respective modulation parameters.

Said radioelectric signals can be digital terrestrial television signals.

Said data processing means can comprise: local units, associated with respective receivers and programmed or configured to: receive said or at least one said reference signal; reconstruct, on the basis of said reference signal or of said reference signals, replicas of the radioelectric signals which would be received by said receivers by direct propagation from said or from each said transmitter situated out of sight if direct propagation such as this were possible; and calculate, by correlation between the signals received by said receivers and said replicas, a plurality of bistatic distances between said receiver, said or at least one said transmitter and said target; and a central unit configured or programmed to receive from said local units the corresponding bistatic distances and to use them to determine the position of said target.

The system can also comprise a device for procuring a common temporal reference shared by said transmitter or transmitters, by said receiver or receivers and by said data processing means.

Yet another subject of the invention is a system for monitoring air traffic comprising, in the guise of primary radar, such a multistatic radar system.

A method and a system according to the invention can be termed "semi-active" or "semi-passive". Indeed, like purely passive methods and systems, they exploit opportunity signals, which do not have to be modified in order to be suitable for the detection of targets. However, a form of cooperation is required on the part of the transmitters, which have to transmit the reference signals by means of a data link provided for this purpose.

BRIEF DESCRIPTION OF THE DRAWINGS

Other characteristics, details and advantages of the invention will emerge on reading the description given with reference to the appended drawings given by way of example and which represent, respectively.

DETAILED DESCRIPTION

Figure 4:
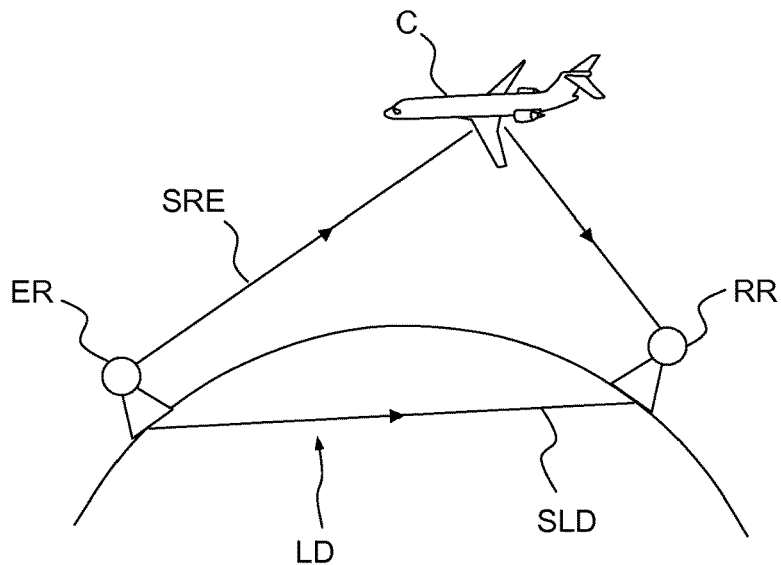
FIG. 4, a diagram illustrating the principle underlying a method according to the invention.

As illustrated in FIG. 4, a detection method according to the invention is based on the use of at least one receiver RR which is situated out of the sight of a transmitter ER. In the case of the figure, it is the curvature of the terrestrial surface which is interposed between the transmitter and the receiver; in other embodiments, it may be an obstacle such as a mountain. The transmitter and the receiver which are not in line of sight are linked together by a data transmission line LD which conveys a signal SLD. The receiver RR uses this signal to reconstruct a replica of that which it would have received by direct propagation originating from the transmitter if such propagation had been possible. The bistatic distance of the target C is therefore determined on the basis of said replica thus reconstructed and of the radioelectric signal generated by the transmitter ER and which reaches the receiver after reflection by said target.

The data transmission line may be wired (coaxial cable, optical fiber etc.), or indeed wireless (in which case, it is necessary to resort to repeaters). It may be dedicated or form part of a telecommunications network. It is preferable that its latency is known or measurable, for example by virtue of a synchronization mechanism which will be detailed further on, or at least constant or indeed slowly varying.

The reference signal SLT may be analog or, preferably, digital. It may be a replica (optionally digitized) of the radioelectric signal SRE—usually converted to intermediate frequency, or indeed to baseband—but more generally it may be any signal transporting all of the information necessary to reconstruct said radioelectric signal.

Figure 5:
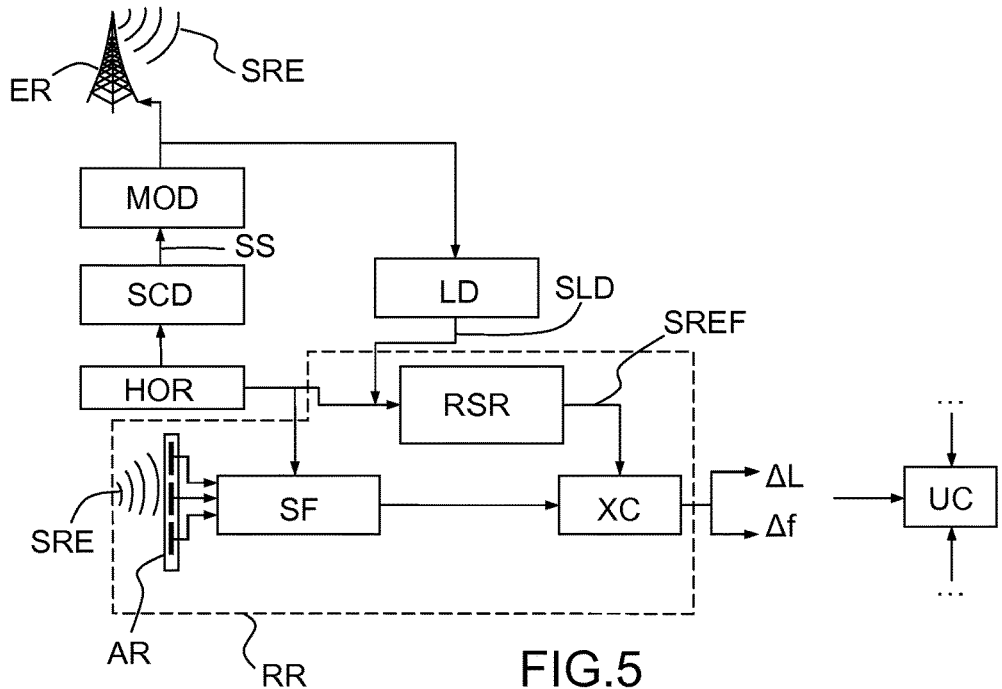
FIG. 5, the functional diagram of a system according to a first embodiment of the invention.

FIG. 5 illustrates in greater detail the structure and the operation of a detection system according to a first embodiment of the invention. The transmitter ER is a digital television transmitter, which receives from a central broadcasting station SCD a digital source signal SS which represents the succession of bytes constituting an MPEG file. This signal drives a digital modulator MOD, parametrized with modulation parameters specific to the transmitter, which generates a signal at intermediate frequency. This signal:

on the one hand, is converted to radiofrequency so as to be irradiated by a transmit antenna in the form of a radioelectric signal SRE;

on the other hand is sampled and quantized so as to be transmitted in digital format along the data transmission line LD, in the form of a digital reference signal SLD. At the level of the receiver RR, a replica reconstruction module RSR uses this digital signal to reconstruct or regenerate a signal SREF "imitating" a signal which would have been received by an antenna of said receiver by direct propagation (converted to intermediate frequency and, if appropriate, digitized). Accordingly, the module RSR must delay the reconstructed replica SREF by a time equivalent to the hypothetical propagation time for a radioelectric signal to travel the distance separating the transmitter and the receiver, minus the latency of the data transmission line LD. This is rendered possible by the existence of a common temporal reference HOR between the transmitter and the receiver. It may for example be a GPS clock.

An equalization of the reconstructed signal can also be envisaged, to imitate the frequency filtering introduced by the propagation in the atmosphere.

In a conventional manner, the receiver also comprises an array antenna AR to receive the radioelectric signal SRE which reaches it by way of a reflection on a target to be detected. This array antenna is driven by a beam-synthesizing circuit SF which determines its reception lobes in such a way as to maximize the signal collected. Indeed, even if the transmitter is not in line of sight, if an adaptive antenna were not used the receiver might pick up interference originating from closer transmitters operating at the same frequency. The signal received by the antenna, after a preprocessing which includes a conversion to intermediate frequency, as well as the reconstructed replica SREF, are communicated to a correlator module XC. The latter calculates the cross-correlation of these two signals with different temporal and frequency shifts, and determines those which maximize this correlation. The temporal shift thus identified provides an item of information $\Delta L$ on the bistatic distance of the target, and the frequency shift $\Delta f$ on its bistatic velocity. Thus, each receiver determines a pair of values ($\Delta L$, $\Delta f$) for each transmitter to which it is linked by the data transmission line LD. A central processing unit UC collects these values, communicated by a plurality of receivers, and uses them—in accordance with the prior art—to locate said target and determine its velocity vector.

Figure 6:
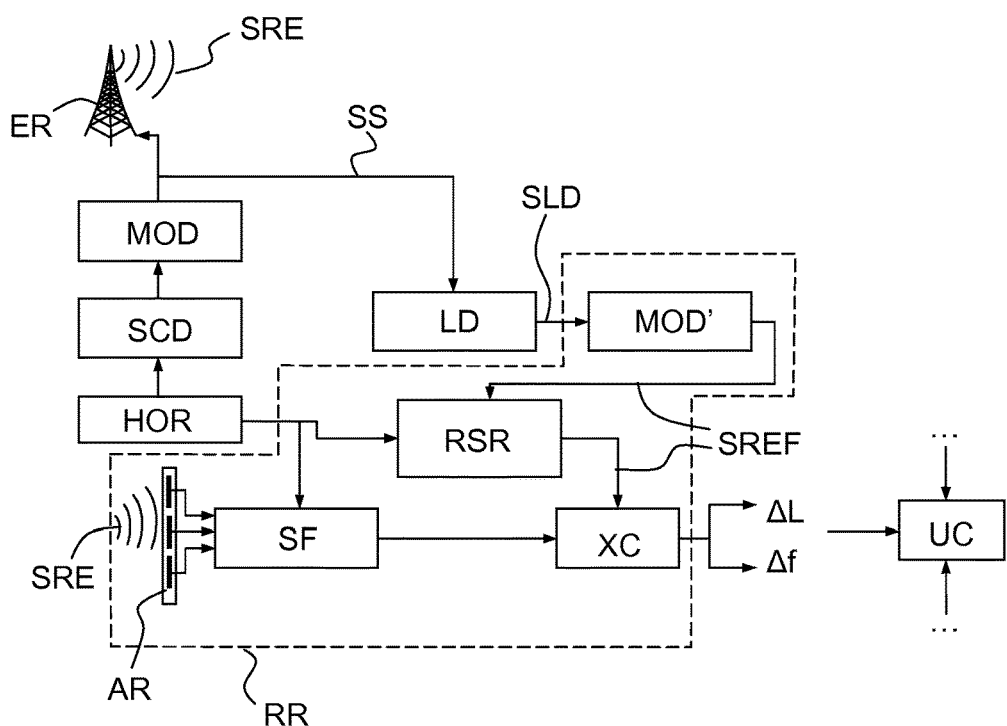
FIG. 6, the functional diagram of a system according to a second embodiment of the invention and alternative to said first embodiment.

The diagram of FIG. 6 illustrates a second embodiment, in which it is the source signal SS which is transmitted along the transmission line LD. A modulator MOD' must then be provided at receiver level to reconstruct the intermediate frequency signal which serves for the reconstruction of the reference signal. This further complication of the receiver constitutes the counterpart of a significant simplification of the data transmission line. Indeed, the central broadcasting station SCD can transmit one and the same source signal SS to several different transmitters, which apply their inherent modulation parameters to it so as to generate respective radioelectric signals. In the second embodiment the data transmission line must transmit this single source signal to the receivers, and not the various modulated signals generated by the transmitters as in the case of the first embodiment.

Figure 7:
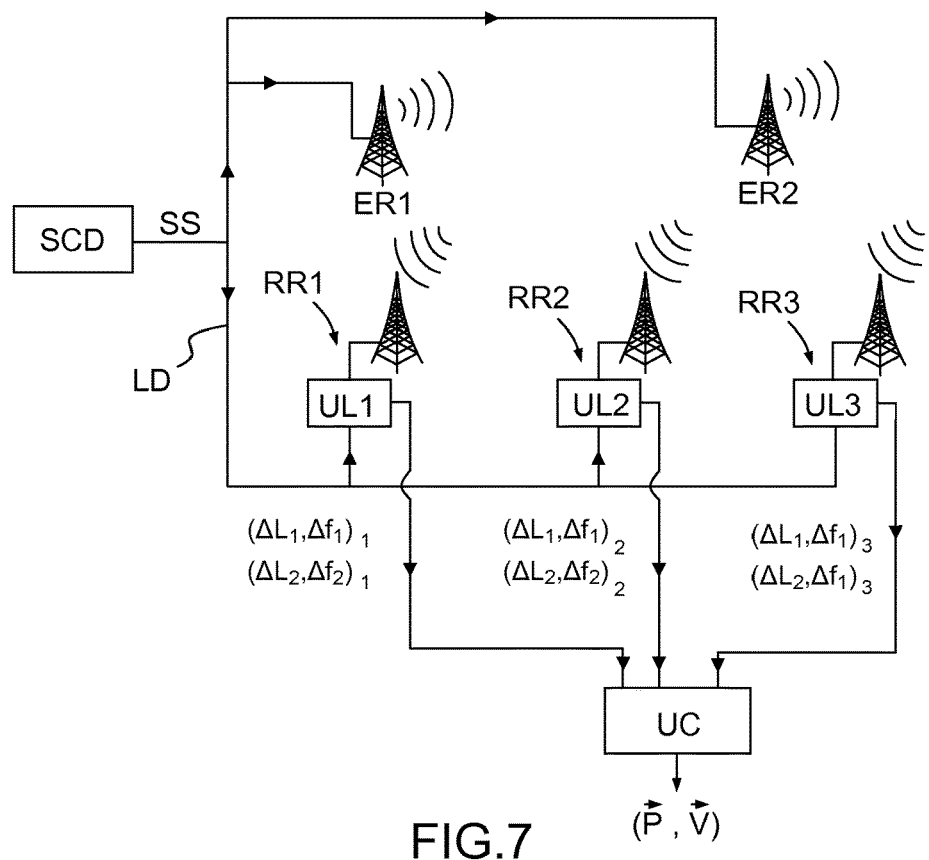
FIG. 7, an overall diagram of a system according to said second embodiment of the invention.

FIG. 7 schematically illustrates the general structure of a system according to said second embodiment. This system comprises a central broadcasting station SCD transmitting the source signal SS to two transmitters ER1, ER2 and (by way of the data transmission line LD) to three receivers RR1, RR2, RR3. Each receiver comprises an antenna and a local data processing unit UL1-UL3. Each said local processing unit comprises the blocks for modulation, reconstruction of the replicas and cross-correlation whose manner of operation was described above, and generates two pairs of values ($\Delta L_i$, $\Delta f_i$)$_j$, where "i" identifies the transmitter (i=1,2) and "j" the receiver (j=1,2,3). These values are transmitted to the central processing unit UC, which makes use thereof to calculate the position $\vec{P}$ and the velocity $\vec{V}$ of the (or of each) target.

It will be noted that, to locate a target, three values $\Delta L_i$ suffice. Now, in the system of FIG. 7 there are six of these values; it is therefore possible to calculate the position $\vec{P}$ in twenty different ways—and because of inevitable errors and inaccuracies, twenty different positions will be obtained. It is possible to exploit this redundancy to improve the synchronization between the receivers and the transmitters, by determining the timing corrections which make it possible to minimize the mean square error between the various calculated positions. In the limit, this may make it possible to determine a common temporal reference without needing to resort to an exterior clock, provided that the latency of the transmission link is constant or, at least, slowly varying. Accordingly, it suffices to supplement the least squares system with an unknown for each transmit and receive pathway; if the number of measurements is sufficient, the identification of these unknown terms is possible.

Figure 1:
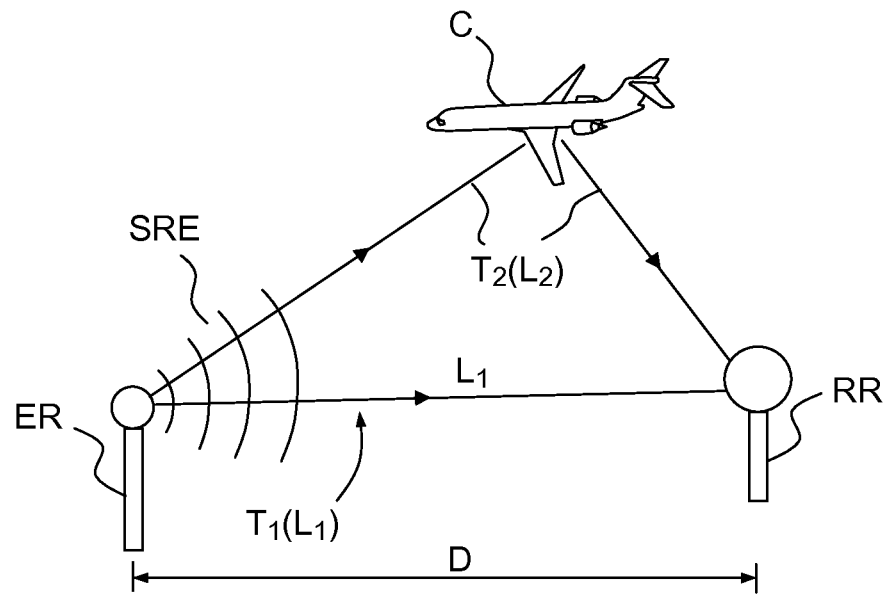
FIG. 1, the principle of multistatic detection.
Figure 2:
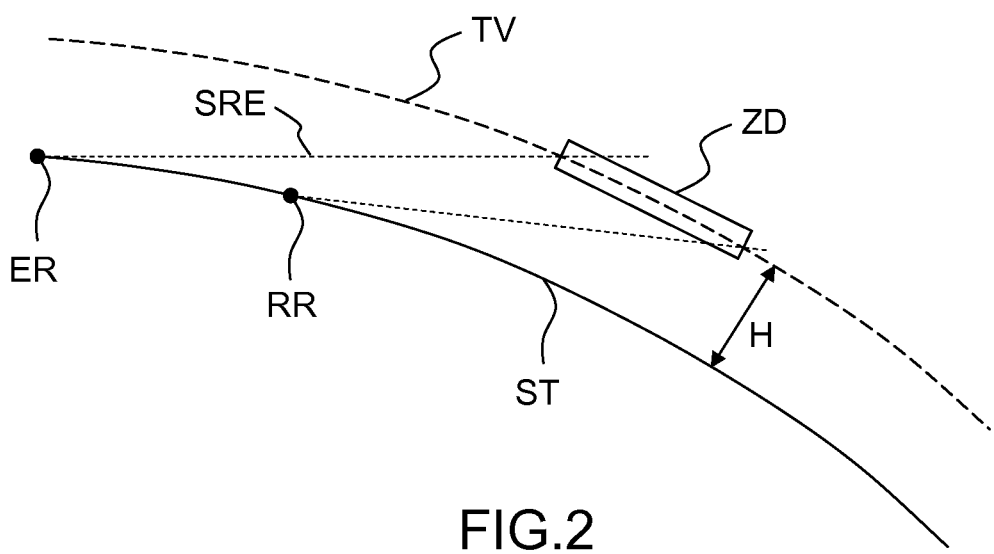
FIG. 2, the propagation of a beam of electromagnetic waves generated by a television transmitter.
Figure 3A:
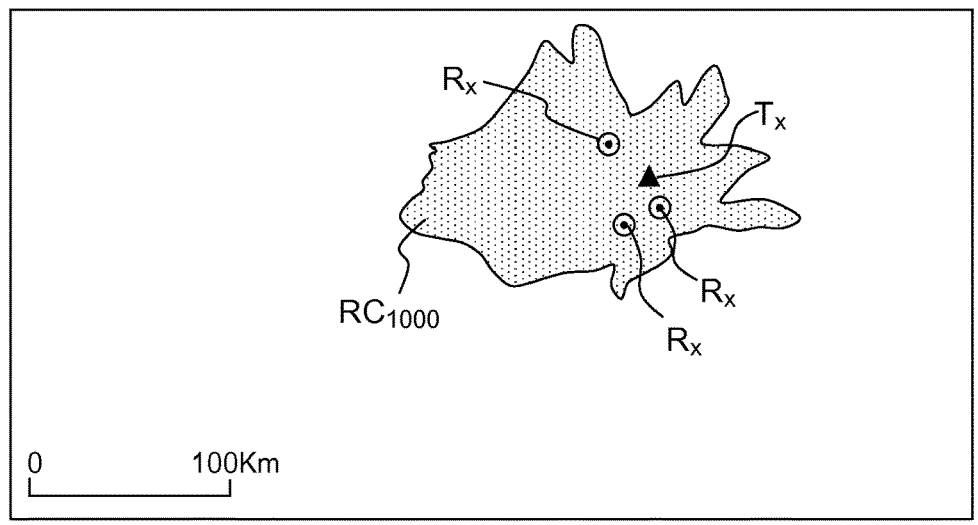
FIGS. 3A and 3B, the radar coverage obtained by means of a conventional passive multistatic system at two different altitudes.
Figure 3B:
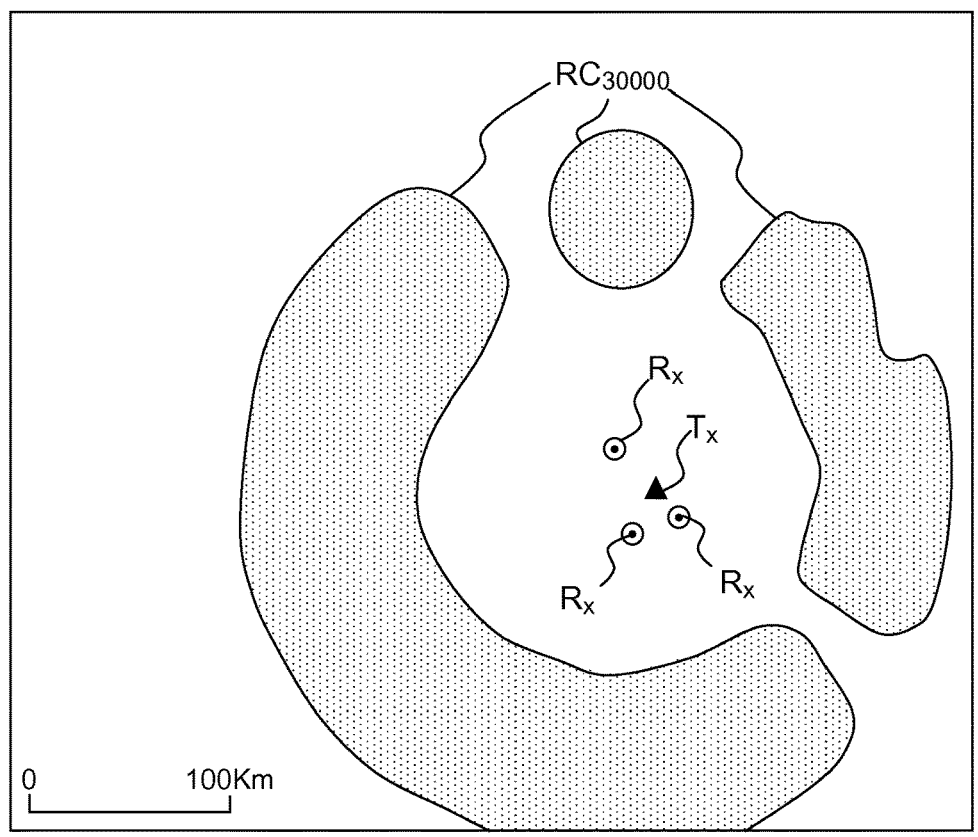
Figure 8A:
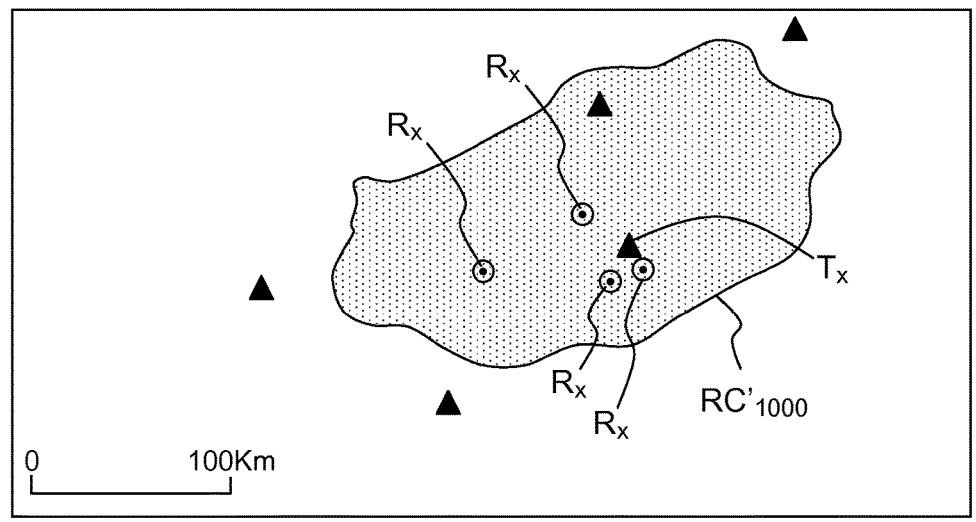
FIGS. 8A and 8B, a technical result of the invention.
Figure 8B:
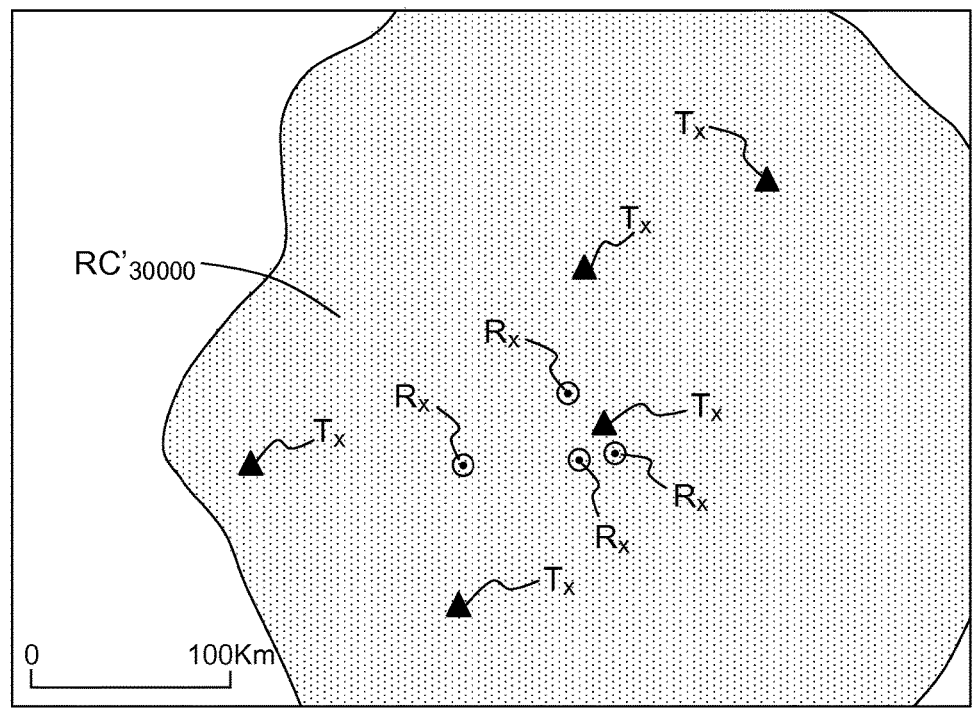

FIGS. 8A and 8B make it possible to appreciate the technical result of the invention. They show the detection coverage obtained by means of a detection system according to the invention, comprising a transmitter and four receivers which are not in sight of said transmitter because of their distance. In FIG. 8A, the region $RC'_{1000}$ represents the coverage at an altitude of 1000 feet (304.8 m); in FIG. 3B, the region $RC'_{30,000}$ represents the coverage at an altitude of 30,000 feet (12.192 m). Even at the latter altitude, there is no "blind cone" on account of the greater transmitter—receivers separation.

The invention claimed is:

1. A method for locating a target comprising the following steps:
    a) receiving, by means of N≥1 receivers, opportunity radioelectric signals transmitted by M≥1 transmitters and reflected by said target, with N·M≥3, said or at least one said transmitter being situated out of the sight of said or of at least one said receiver;
    b) receiving, by means of a data transmission link, one or more reference signals, representative of the radioelectric signals transmitted by said or each said transmitter situated out of the sight of said or of at least one said receiver; and
    c) determining the position of said target on the basis of said radioelectric signals and of said reference signal or signals;
    wherein said step c) comprises the reconstruction, on the basis of said reference signal or signals, of replicas of the radioelectric signals which would be received by said or each said receiver by direct propagation from said or from each said transmitter situated out of sight if direct propagation such as this were possible.

2. The method of claim 1, wherein said reconstruction comprises an operation of frequency-shifting of said replicas.

3. The method of claim 2, wherein said reconstruction comprises an operation of compensating for the transmission delay of said reference signal or signals along said data transmission line.

4. The method of claim 3, wherein said reconstruction also comprises an operation of temporal shifting of said replicas so as to introduce a delay proportional to the distance between said or each transmitter situated out of sight and said or each said receiver.

5. The method of claim 1, wherein said step c) is implemented with the aid of a common temporal reference shared by said transmitter or transmitters and by said receiver or receivers.

6. The method of claim 1, wherein said step c) comprises: the calculation of at least three bistatic distances between said or at least one said receiver, said or at least one said transmitter and said target, this calculation being performed by correlation between the signals received by said receiver or said receivers and said replicas; and the location of said target on the basis of said bistatic distances.

7. The method of claim 6, wherein said step c) comprises an operation of iterative synchronization of said replicas with said common temporal reference, carried out by minimizing the disparities between the positions of said target that are determined using various sets of three said bistatic distances.

8. The method of claim 5, wherein said step c) comprises an operation of synchronizing said replicas with said common temporal reference by means of temporal markers contained in said radioelectric signals and in said or each said reference signal.

9. The method of claim 6, wherein said correlation is performed using a plurality of versions of said replicas exhibiting different Doppler shifts, its result being also used to determine a velocity of displacement of said target.

10. The method of claim 1, wherein said step c) also comprises an operation of equalizing said replicas so as to simulate a direct propagation between a said transmitter and a said receiver.

11. The method of claim 1, wherein said radioelectric signals are television signals.

12. The method of claim 1, wherein said or each reference signal is a source signal, on the basis of which a plurality of said transmitters generate the corresponding radioelectric signals by using respective modulation parameters.

13. An application of the method of claim 1 to aircraft location.

14. A multistatic radar system comprising
M≥1 transmitters of opportunity radioelectric signals,
N≥1 receivers for receiving said radioelectric signals, with N·M≥3, said or at least one said transmitter being situated out of the sight of said or of at least one said receiver, as well as data processing means;
also comprising a data transmission link for transmitting to said data processing means one or more reference signals, representative of the radioelectric signals transmitted by said or each said transmitter situated out of the sight of said or of at least one said receiver, said data processing means being configured or programmed to determine the position of a target reflecting the radioelectric signals transmitted by said transmitter or said transmitters on the basis of the radioelectric signals received by said receiver or said receivers and of said reference signal or of said reference signals,
wherein said data processing means are configured and programmed to reconstruct, on the basis of said reference signal or of said reference signals, replicas of the radioelectric signals which would be received by said or each said receiver by direct propagation from said or from each said transmitter situated out of sight if direct propagation such as this were possible, and to use said replicas to determine the position of said target.

15. The system of claim 14, wherein said reference signal is representative of a source file on the basis of which a plurality of said transmitters generate the corresponding radioelectric signals by using respective modulation parameters.

16. The system of claim 14, wherein said radioelectric signals are digital terrestrial television signals.

17. The system of claim 14, wherein said data processing means comprise:
local units, associated with respective receivers and programmed or configured to: receive said or at least one said reference signal; reconstruct, on the basis of said reference signal or of said reference signals, replicas of the radioelectric signals which would be received by said receivers by direct propagation from said or from each said transmitter situated out of sight if direct propagation such as this were possible; and calculate, by correlation between the signals received by said receivers and said replicas, a plurality of bistatic distances between said receiver, said or at least one said transmitter and said target; and
a central unit configured or programmed to receive from said local units the corresponding bistatic distances and to use them to determine the position of said target.

18. The system of claim 14, also comprising a device for procuring a common temporal reference shared by said transmitter or transmitters, by said receiver or receivers and by said data processing means.

19. A system for monitoring air traffic comprising, as primary radar, the multistatic radar system of claim 14.

20. An application of the method of claim 1 for primary monitoring of air traffic.

* * * * *